US007248333B2

(12) United States Patent
Okuyama

(10) Patent No.: US 7,248,333 B2
(45) Date of Patent: Jul. 24, 2007

(54) APPARATUS WITH LIGHT-MODULATING UNIT FOR FORMING PATTERN

(75) Inventor: Takashi Okuyama, Saitama (JP)

(73) Assignee: ORC Manufacturing Co., Ltd., Tokyo (JP)

( * ) Notice: Subject to any disclaimer, the term of this patent is extended or adjusted under 35 U.S.C. 154(b) by 85 days.

(21) Appl. No.: 11/200,200

(22) Filed: Aug. 10, 2005

(65) Prior Publication Data

US 2006/0033897 A1 Feb. 16, 2006

(30) Foreign Application Priority Data

Aug. 10, 2004 (JP) ........................... P2004-233146

(51) Int. Cl.
*G03B 27/68* (2006.01)

(52) U.S. Cl. .................................... 355/52; 250/492.22

(58) Field of Classification Search .................. 355/52, 355/53, 55; 430/5, 311; 250/492.2, 492.22
See application file for complete search history.

(56) References Cited

U.S. PATENT DOCUMENTS

2004/0218161 A1 11/2004 Okuyama
2005/0030500 A1 2/2005 Okuyama

FOREIGN PATENT DOCUMENTS

JP 2000-122303 4/2000
JP 2003-057837 * 2/2003

OTHER PUBLICATIONS

U.S. Appl. No. 10/834,236, filed Apr. 29, 2004.
English Language abstract of JP-2000-122303.
English Language abstract of JP-2003-057837.

* cited by examiner

*Primary Examiner*—Henry Hung Nguyen
*Assistant Examiner*—Chia-how Michael Liu
(74) *Attorney, Agent, or Firm*—Greenblum & Bernstein, P.L.C.

(57) ABSTRACT

An apparatus for forming a pattern has a light-modulating unit, a scanner, a pattern data processor, a light modulating controller, a position-error detector, and a correction value calculator. The pattern data processor generates band-pattern data corresponding to each scanning band on the basis of pattern data matching a preceding pattern that is repeatedly and regularly formed on the photo-sensitive material. The position-error detector detects a position-error of the preceding pattern relative to a pattern area. The correction value calculator calculates an alignment correction value in each pattern area on the basis of the position-error, so as to overlay the pattern on the preceding pattern. The pattern data processor corrects the band-pattern data in accordance with the alignment correction value while classifying each exposure data of the band-pattern data into a corresponding pattern area.

19 Claims, 9 Drawing Sheets

30
44
LIGHT CONTROLLER
21
SEMICONDUCTOR LASER
22
DMD
15
SW
15
SUBSTRATE
TABLE
18
PATTERN DATA
42
RASTER DATA CONVERTER
33
BIT-MAP MEMORY
34
DMD CONTROLLER
40
POSITION DETECTOR
46
X-DIRECTION DRIVER
48
Y-DIRECTION DRIVER
32
SYSTEM CONTROL CIRCUIT
CPU
32C
ROM
32A
RAM
32B
TABLE CONTROLLER
38
IMAGE PROCESSOR
39

APPARATUS WITH LIGHT-MODULATING UNIT FOR FORMING PATTERN

BACKGROUND OF THE INVENTION

1. Field of the Invention

The present invention relates to an apparatus and method that directly writes or forms a pattern on a photosensitive material such as a substrate, especially, it relates to the positioning of the pattern.

2. Description of the Related Art

An exposure unit with a photolithography function transfers a circuit pattern to a substrate by using a photo-mask or reticle to repeatedly and regularly form a circuit pattern on the total area of a substrate. In the exposure unit, a shot-exposure is repeatedly performed in accordance with the Step & Repeat method. Further, a beam writer that directly writes or forms a pattern without a photo-mask/reticle is also applied. In this case, a light-modulating unit such as a DMD (Digital Micro-mirror Device) or an LCD (Liquid Crystal Device), which has two-dimensionally arrayed light-modulator elements, is utilized instead of a line-scanning.

In the manufacturing process of the substrate, the substrate occasionally deforms due to the heating process. When circuit patterns are regularly and repeatedly formed on the substrate, the deformation of each pattern is different to each other, since the degree of deformation varies with the position of the substrate.

Further, when forming patterns in layers on the substrate by using the exposure unit, the positioning precision is not sufficient, so that a position-error, such as a rotation-error or shift-error, is caused in each pattern.

To correct the position-error of the pattern caused by the deformation, for example, holes are formed in advance such that the holes are positioned at the corners of each pattern, and position-errors between positions of marks formed at a correct position and the position of the holes, are detected for each pattern. Then, the position of the pattern to be formed on the substrate is corrected or modified in accordance with the position-error.

SUMMARY OF THE INVENTION

An object of the present invention is to provide an apparatus and method for forming a pattern that is capable of precisely forming a pattern or patterns in layers on a substrate, regardless of a construction of a light-modulating unit such as a DMD.

An apparatus for forming a pattern has a light-modulating unit, a scanner, a pattern data processor, a light modulating controller, a position-error detector, and a correction value calculator. The light-modulating unit has a plurality of regularly arrayed light modulators, and selectively directs light emitted from a light source to a photo-sensitive material. The scanner scans an exposure area, exposed by the light-modulating unit, along a direction defined by a series of scanning bands. The pattern data processor generates band-pattern data corresponding to each scanning band on the basis of pattern data matching a preceding pattern. Note, the preceding pattern is repeatedly and regularly formed on the photo-sensitive material. The band-pattern data is constructed of exposure data, which corresponds to the array of the light-modulators. The light-modulating controller controls the light modulators respectively in accordance with the band-pattern data to form a pattern on the photo-sensitive material. The position-error detector detects a position-error of the preceding pattern relative to a pattern area. Herein, the pattern area is an area surrounded by a grid, and the grid is defined on the photo-sensitive material so as to encompass the preceding pattern. The correction value calculator calculates an alignment correction value in each pattern area on the basis of the position-error, so as to overlay the pattern on the preceding pattern. The pattern data processor corrects the band-pattern data in accordance with the alignment correction value while classifying each exposure data of the band-pattern data into a corresponding pattern area.

BRIEF DESCRIPTION OF THE DRAWINGS

The present invention will be better understood from the description of the preferred embodiment of the invention set fourth below together with the accompanying drawings, in which.

DESCRIPTION OF THE PREFERRED EMBODIMENTS

Hereinafter, the preferred embodiment of the present invention is described with reference to the attached drawings.

Figure 1:
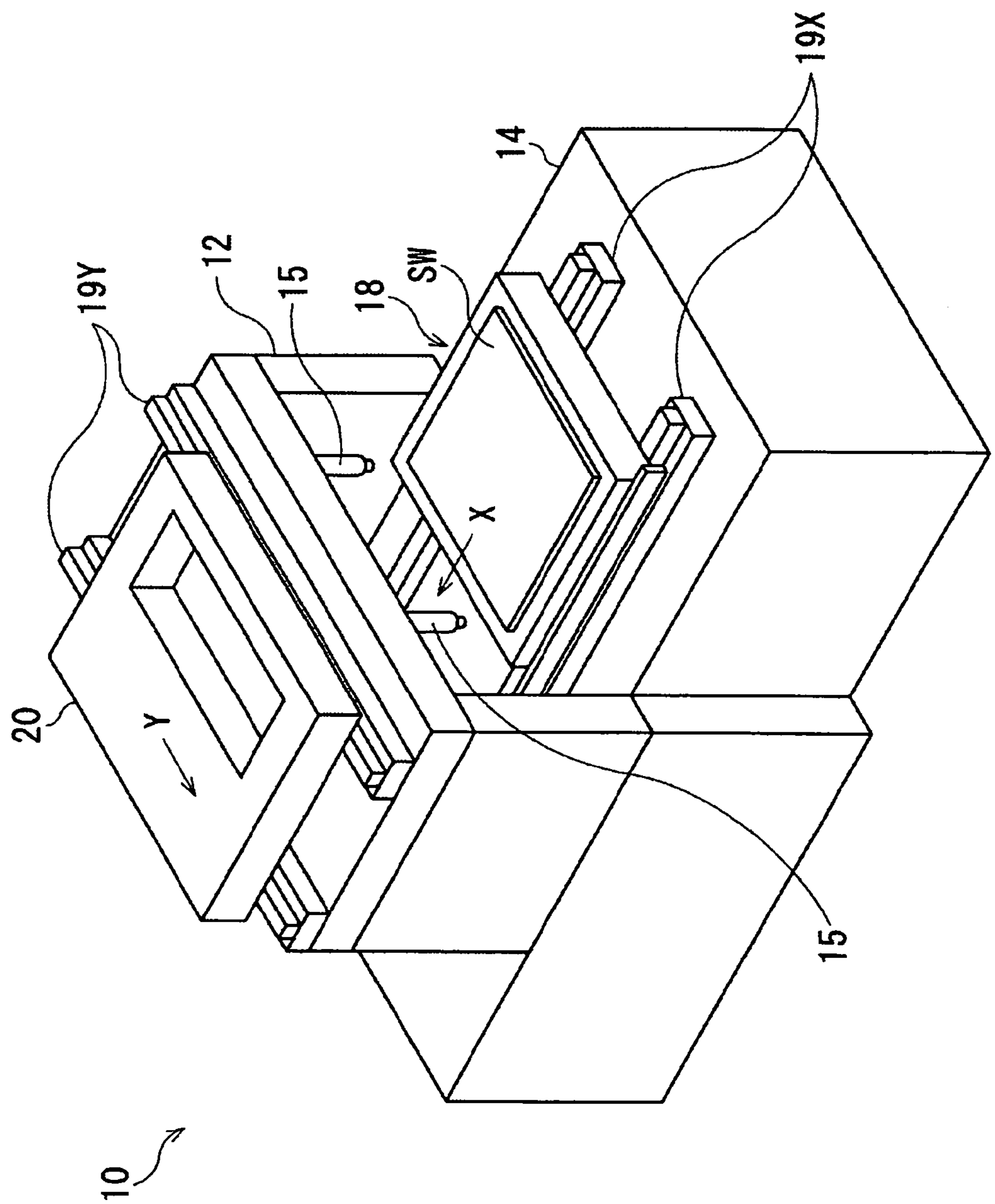
FIG. 1 is a schematic perspective view of a beam writer according to the present embodiment.
Figure 2:
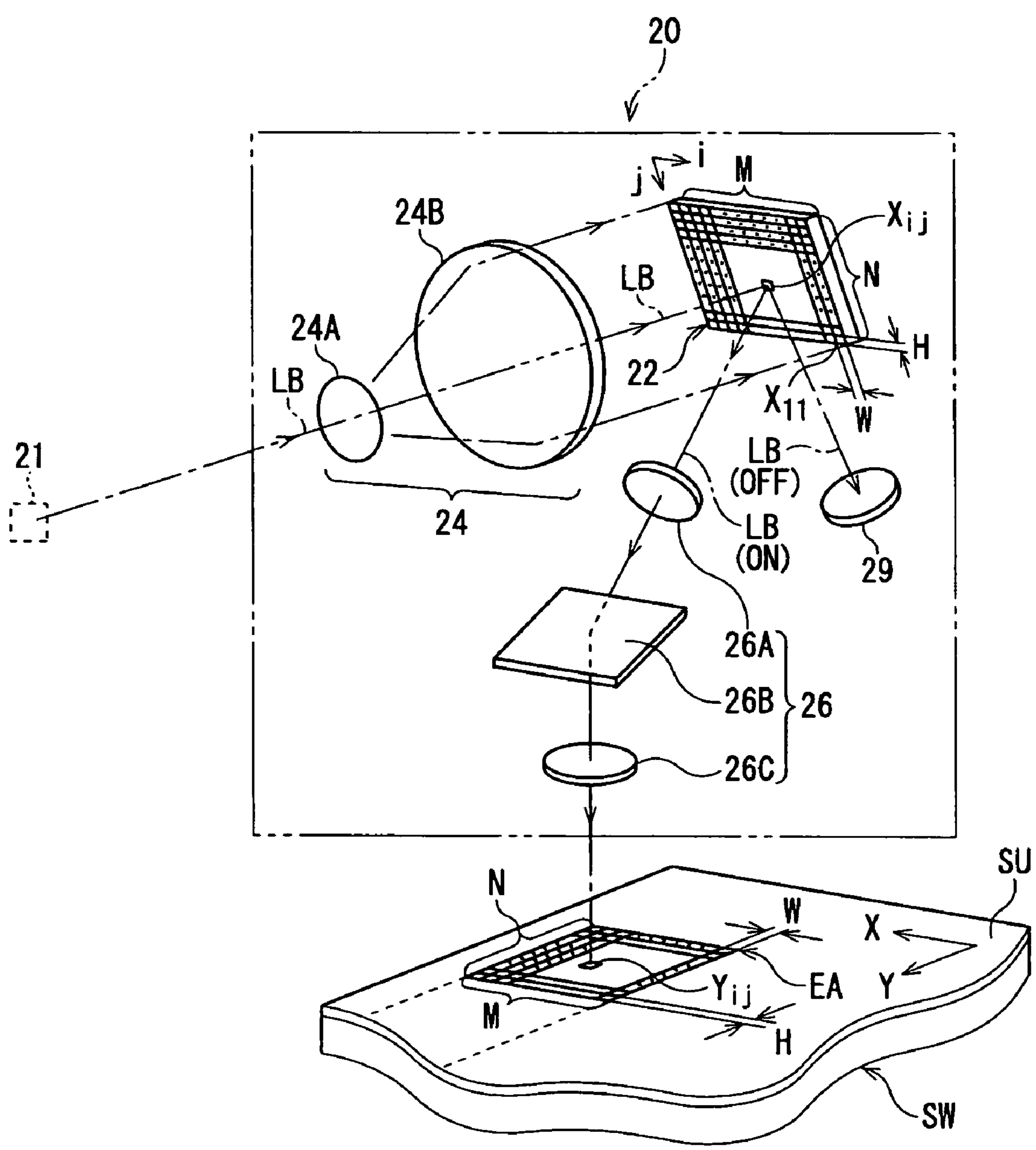
FIG. 2 is a schematic view of an exposure unit.

FIG. 1 is a schematic perspective view of a beam writer according to the present embodiment. FIG. 2 is a schematic view of an exposure unit.

A beam writer 10 that performs a raster-scanning while continuously moving a table 18, has a gate member 12 and a base 14. A substrate SW is put on the table 18, and the table 18 is supported by guide rails 19X, which are parallel to each other. The guide rails 19X are put on the base 14, and the table 18 is capable of moving along the guide rails 19X. Guide rails 19Y, which are parallel to each other and support an exposure unit 20, is put on the gate member 12. The exposure unit 20 is capable of moving along the pair of guide rails 19Y.

A moving direction of the table 18 (hereinafter, designated as "X-direction") is perpendicular to a moving direction of the exposure unit 20 (hereinafter, designated as "Y-direction"). Herein, the X-direction is defined as a main-scanning direction and the Y-direction is defined as a sub-scanning direction. The table 18 and the exposure unit 20 are respectively moved by an X-direction driver and a Y-direction driver (herein, not shown), and a writing controller (herein, not shown) controls the moving of the table 18 and the exposure unit 20.

As shown in FIG. 2, the exposure unit 20 has a semiconductor laser 21, a DMD (Digital Micro-mirror Device) 22, an illuminating optical system 24, and an objective optical system 26. The illuminating optical system 24 is arranged between the semiconductor laser 21 and the DMD 22, whereas the objective optical system 26 is arranged between the DMD 22 and the substrate SW.

Laser beam LB emitted from the semiconductor laser 21 is directed to the illuminating optical system 24 via a fiber-optic bundle (not shown). The illuminating optical system 24 has a convex lens 24A and a collimator lens 24B. The laser beam LB is irradiated over the total area of the DMD 22 by passing the beam through the illuminating optical system 24. The DMD 22 is constructed of rectangular micro-mirrors regularly arrayed in a matrix, the size of which is micro order. The micro-mirror is pivotable due to the effect of static electricity and can change a position or angle. Herein, "M×N" square micro-mirrors are arrayed. Each micro-mirror is hereinafter designated as "$X_{ij}$" ($1 \leqq i \leqq M$, $1 \leqq j \leqq N$) in accordance with the position (i,j) on the DMD 22. Also, the width and the height of the micro-mirror "$X_{ij}$" are respectively designated as "W" and "H" (W=H).

The micro-mirror $X_{ij}$ is maintained at a first position or angle, which reflects the laser beam LB emitted from the semiconductor laser 21 to an exposure-surface SU on the substrate SW, or is maintained at a second position or angle, which reflects the laser beam LB outside the area of the substrate SW. The angle of the micro-mirror $X_{ij}$ is changed by a control signal from the writing controller. When the micro-mirror $X_{ij}$ is positioned at the first angle, namely, the micro-mirror $X_{ij}$ is ON, the laser beam LB reflected by the micro-mirror $X_{ij}$ and is directed to the objective optical system 26.

The objective optical system 26 has two convex lenses 26A, 26C and a reflector 26B. By light passing through the objective optical lens 26, a pattern image is formed on the exposure-surface SU covered by the resist. The power of magnification of the objective optical lens 26 is herein "1", therefore a size of a spot "$Y_{ij}$" projected on the exposure-surface SU is the same as the size of the micro-mirror "$X_{ij}$". On the other hand, when the micro-mirror "$X_{ij}$" is positioned at the second angle, namely, the micro-mirror "$X_{ij}$" is OFF, the beam LB, reflected by the micro-mirror "$X_{ij}$", is directed to the light-absorbing plate 29 so that the beam LB is irradiated away from the exposure-surface SU.

When all of the micro-mirrors are positioned at the first angle, namely, a spot having a size "(M×W)×(N×H)" (hereinafter, called as an "exposure area") is exposed or formed on the exposure-surface SU. Each micro-mirror "$X_{ij}$" is controlled so as to be turned ON/OFF independently in accordance with the pattern data. Therefore, Light directed from the DMD 22 to the substrate SW is constructed of selectively reflected luminous flux, namely, light is constructed of a group of light reflected on specific micro-mirrors that are ON. Thus, light corresponding to a circuit pattern to be formed on the exposure area EA is irradiated.

The substrate SW is composed of a silicon-wafer, printed board, or glass plate. To form a pattern in layers, the substrate SW has been subjected to an exposure process by an exposure-unit (not shown) using the photo-mask, and a given circuit pattern is repeatedly and regularly formed on the substrate SW in advance. After a resist material is applied on the substrate SW, the substrate SW is arranged on the table 18 of the beam writer 10. A plurality of CCD cameras 15, which is arranged in the gate member 14 and arrayed along the Y-direction, detects a position-error of the circuit pattern that is formed on the substrate SW while shifting the table 18 in the X-direction. Note that, in FIG. 1, only two cameras are shown. After the position-error of the pattern is detected, the patterning is started.

The substrate SW is positioned at a given initial position for starting the writing process, then the table 18 moves in the X-direction, in a situation where the exposure unit 20 does not move. A series of scanning-bands is defined so as to match the size of exposure area EA along the Y-direction, and the exposure area EA moves in a scanning-band as the table 18 moves in the X-direction. The writing process is performed in accordance with the relative position of the exposure area EA. After one band worth of scanning is finished, the exposure unit 20 shifts along the Y-direction by a given distance relative to the substrate SW, and the exposure area EA moves to a next scanning band. To perform raster scanning, the exposure area EA moves along the series of scanning bands in order, so that the writing process is performed for the total area of the substrate SW. After the writing process is finished, a developing process, an etching process, and a resist removal process, and so on, are carried out. Consequently, stratified circuit patterns are formed on the substrate SW.

Figure 3:
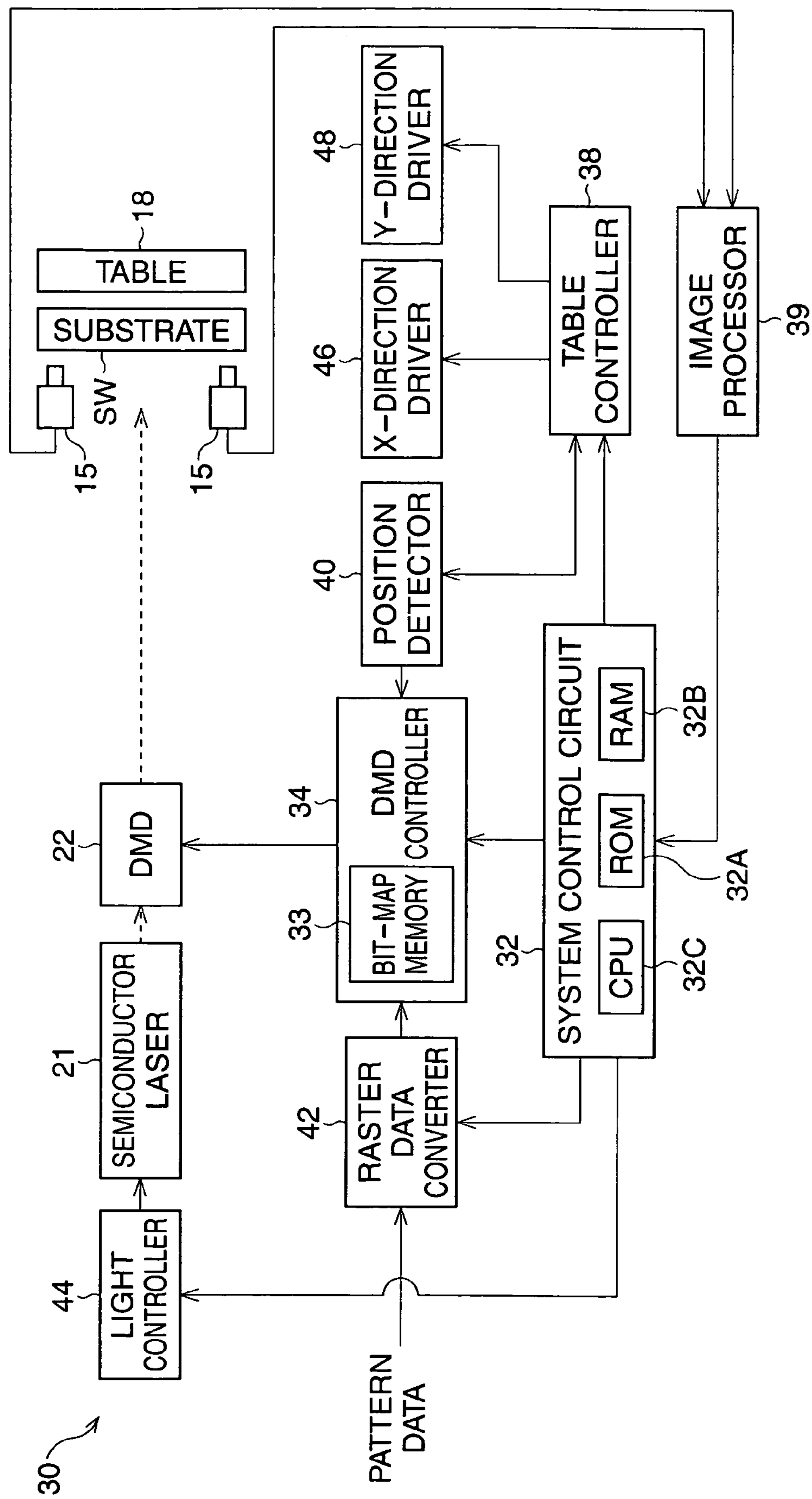
FIG. 3 is a block diagram of the beam writer.

FIG. 3 is a block diagram of the beam writer 10. The writing controller 30 has a system control circuit 32, a DMD controller 34, a table controller 38, an image processor 39, a position detector 40, a raster data converter 42, and a light controller 44.

Pattern data of a circuit pattern to be totally formed on the substrate SW, such as CAD data, is transmitted from a workstation (not shown) to the beam writer 10 as vector data. In the raster data converter 42, the pattern data of the vector data is converted to raster data. The raster data is two-dimensional dot data corresponding to the circuit pattern and is represented by two-values (0 or 1). Each dot data represents ON/OFF of a corresponding micro-mirror. The raster data is generated in each scanning band, and is successively stored in a bit-map memory 33 while being synchronized with the relative position of the exposure area EA.

The table controller 38 controls the X-direction driver 46 and the Y-direction driver 48 to control the timing of the shifting and stopping of the table 18 and the exposure unit 20. The position detector 40 detects a relative position of the exposure area EA on the basis of signals fed from the table controller 38, and outputs detecting signals to the DMD controller 34. In the DMD controller 34, raster data corresponding to the position of the exposure area EA is read from the bit-map memory 33. Then, exposure signals that turn each micro-mirror ON or OFF are output to the DMD 22 while being synchronized with the detecting signals output from the position detector 40. The system control circuit 32 including the CPU 32C, RAM 32B, and ROM 32A controls the writing process, and outputs control signals to each circuit, such as the DMD controller 34, the table controller 38, and so on.

The two cameras 15 for detecting the position-error are connected to the image processor 39. Before the writing process, the substrate SW is photographed along the scanning line (X-direction) by the cameras 15 while moving the table 18. Image signals output from the camera 15 are processed in the image processor 39 so that the position-error is detected. The system control circuit 32 outputs control signals to correct raster data on the basis of the detected position-error, and the corrected raster data is stored in the bit-map memory 33. Then, the corrected raster data is read from the bit-map memory 33 and the exposure data is output to the DMD 22.

Figure 4:
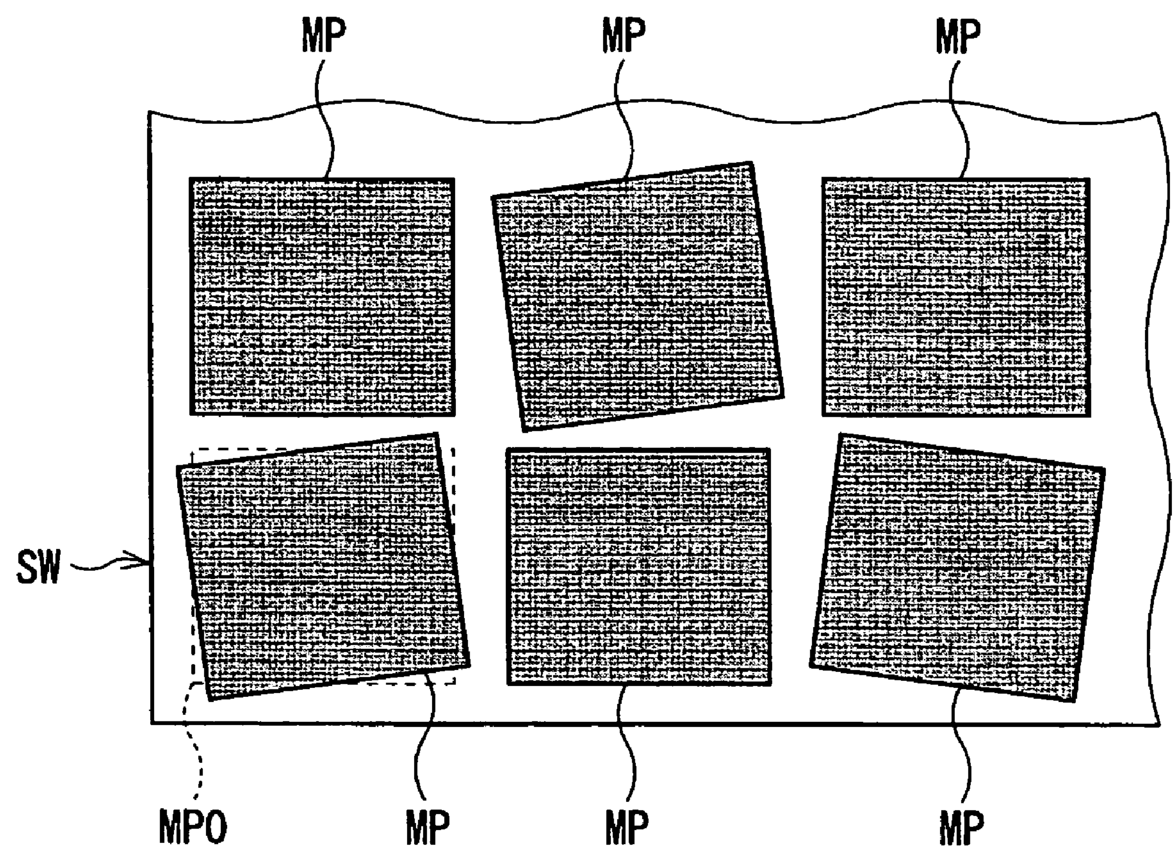
FIG. 4 is a view showing a position-error of a pattern previously formed on the substrate.

FIG. 4 is a view showing a position-error of a pattern previously formed on the substrate.

As described above, before the writing process is performed by the beam writer 10, one pattern MP is repeatedly formed on the substrate SW by using the exposure unit utilizing the photo-mask. In FIG. 4, the pattern MP is represented as rectangular pattern corresponding to the photo-mask, for ease of explanation. Actually, a pattern wherein wiring extends various directions is formed on the substrate SW.

In the beam writer 10, the writing process is performed so as to match the circuit pattern with the previously formed pattern MP to form the stratified pattern, by overlaying the pattern on the preceding pattern MP. However, the pattern MP is not formed at a correct position since the positioning-precision when using the shot type exposure unit is not sufficiently accurate. For example, a position of a pattern formed in the left-corner of the substrate SW does not coincide with an area MPO wherein the pattern should be actually formed, since a rotation-error occurs. The position-error is different in each pattern, a shift-error along the upper and lower directions and the rotation-error occur in each pattern.

Figure 5:
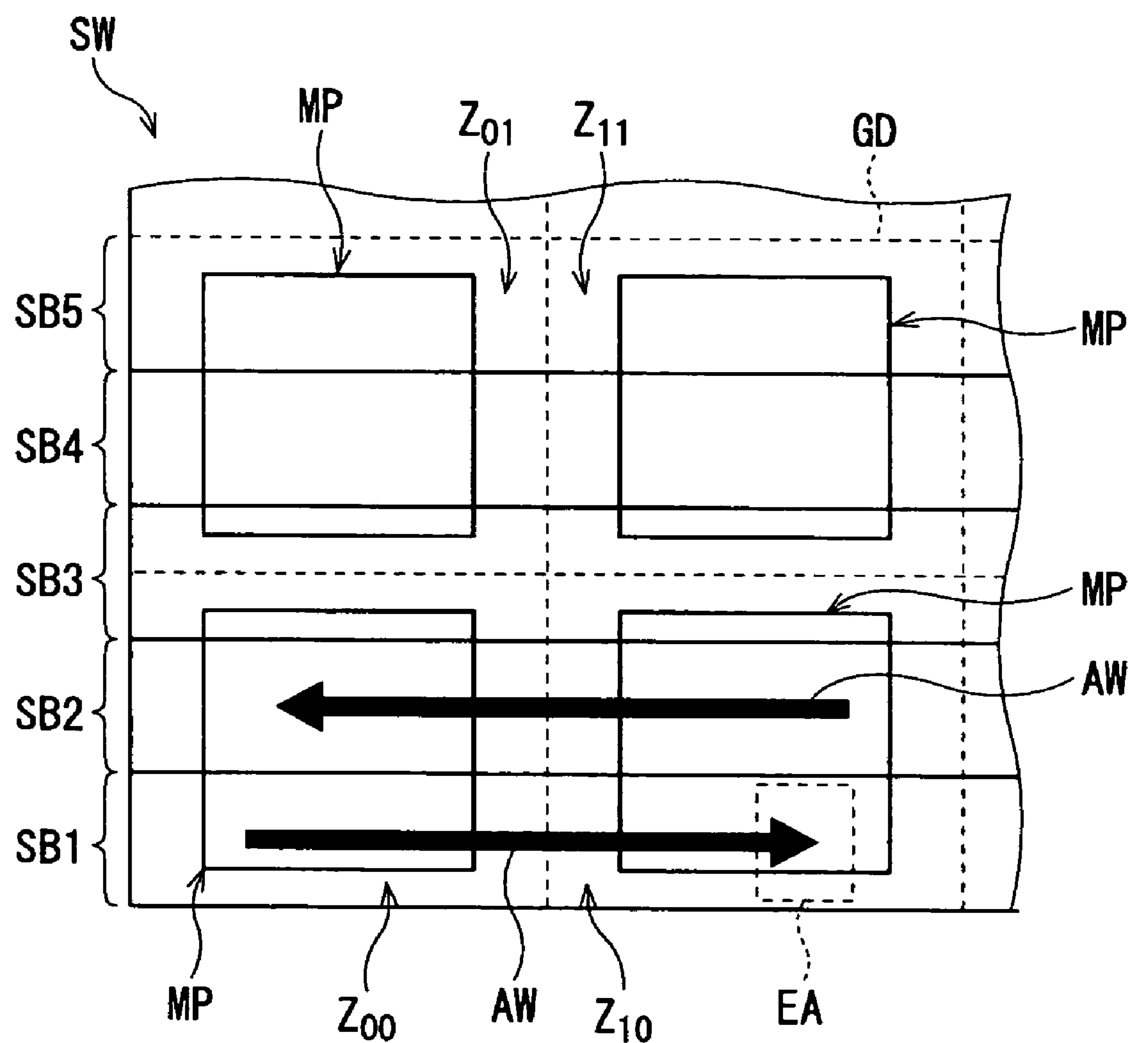
FIG. 5 is a view showing a pattern area defined on the substrate.

FIG. 5 is a view showing a pattern area defined on the substrate SW.

The series of scanning bands SB1, SB2, . . . , are defined in accordance with the size of the exposure area EA in the Y-direction. The pattern MP, formed by the shot-type exposure unit, spreads over a boundary line of the scanning-bands. In other words, the pattern MP has a size that is not settled within one scanning band. The pattern data fed from the workstation, which is vector data, is divided into plural raster data to generate raster data in each scanning band.

A Grid GD is defined on the substrate SW in accordance with the size of the pattern MP so as to encompass the pattern MP. Herein, a pattern area, which is a square area formed by the grid GD, is represented by "$Z_{lm}$" ($0 \leqq 1 \leqq L$, $0 \leqq m \leqq M$). In FIG. 5, pattern areas $Z_{00}$, $Z_{10}$, $Z_{01}$, and $Z_{11}$ are shown. The position-error of the pattern MP, caused by the positioning-precision of the exposure unit, is detected in each pattern area $Z_{lm}$. Based on the detected position-error, the written position or spot is corrected or modified in each pattern area $Z_{lm}$.

Figure 6:
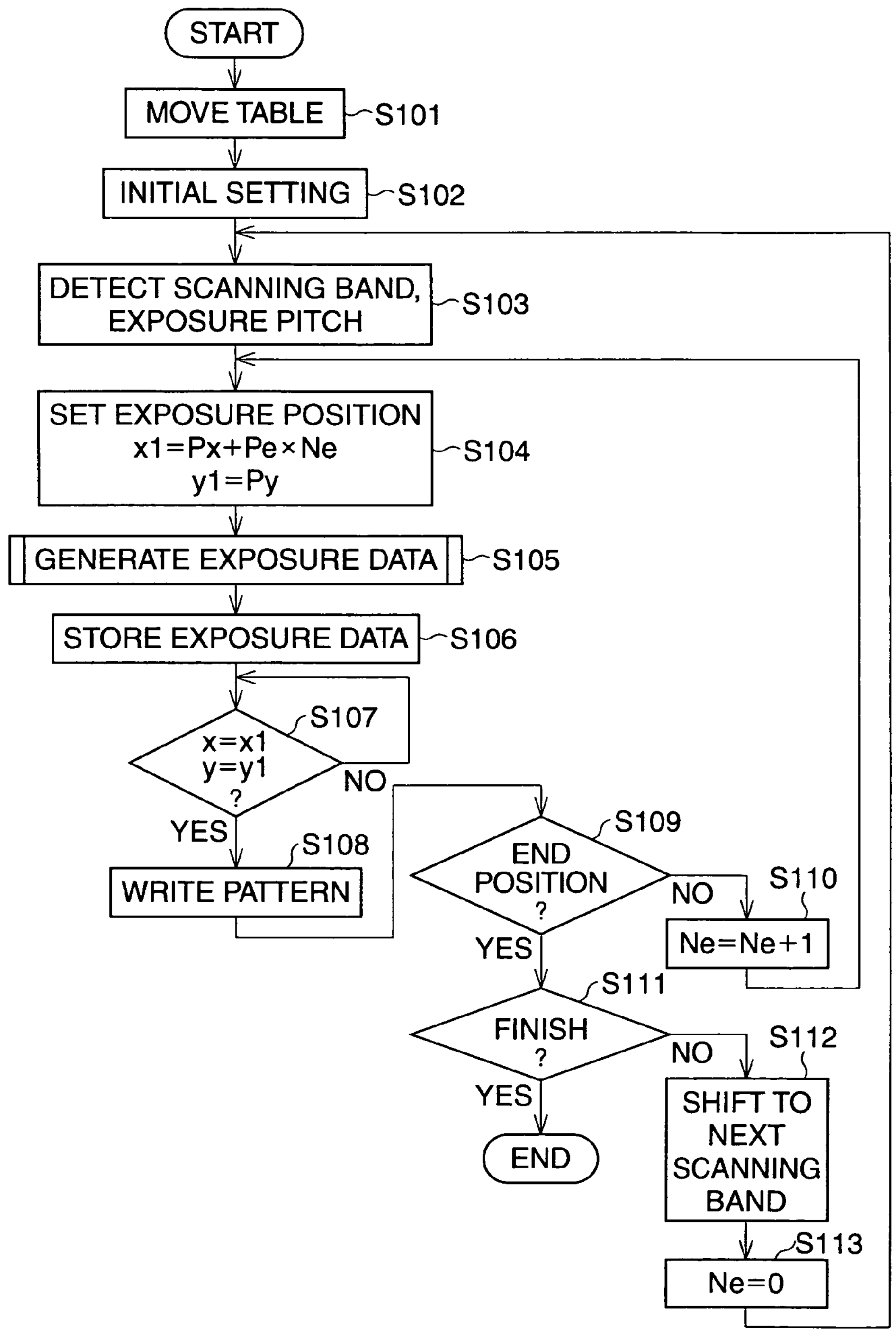
FIG. 6 is a flowchart of a writing process performed by the writing controller.

FIG. 6 is a flowchart of a writing process performed by the writing controller 30. After an operation for starting the writing process is performed, the writing process is started.

In Step S101, control signals are output from the table controller 38 to the X-direction driver 46 to move the table 18 in the X-direction. Herein, as shown in FIG. 5, the substrate SW is scanned from bottom to top as shown by an arrow AW. In Step S102, an initial setting is performed for variable. In Step S103, a scanning band that the exposure area EA shifts at the present time is detected. Also, in Step S103, an exposure pitch, namely, an irradiating interval of light for forming the pattern on the substrate SW, is detected for performing a multiple exposure process. Note, the multiple exposure process that intermittently irradiates light on the substrate SW at a given interval corresponding to the exposure pitch, is well known as a prior art.

In Step S104, a relative position (x1, y1) of the exposure area EA to be irradiated by the DMD 22 (hereinafter, called as "an exposure-execution position") is set based on the following formula.

$$x1 = Px + Pe \times Ne \quad (1)$$

$$y1 = Py \quad (2)$$

The exposure-execution position (x1, y1) indicates a representative position of the exposure area EA. The "(Px, Py)" indicates a representative position of the scanning band wherein the exposure area EA shifts, herein represented by coordinates of the end point of the scanning start position. The "Pe" indicates a pitch of the multiple exposure process. The "Ne" indicates the number of the multiple exposure process. The pitch "Pe" is very small relative to the width of the exposure area EA along the main scanning direction (X-direction).

In Step S105, based on the exposure execution position (x1, y1), exposure data is generated as raster data. Then, in Step S106, exposure data is stored in the bit-map memory 33. In Step S107, it is determined whether the relative position of the shifting exposure area EA has reached the exposure-execution position (x1, y1). Note, the time is counted after the writing process is started, and the relative position of the exposure area EA is detected on the basis of the moving-speed of the table 18. When it is determined that the relative position of the shifting exposure area EA has not reached the exposure-execution position (x1, y1), Step S107 is repeatedly performed. On the other hand, when it is determined that the relative position of the shifting exposure area EA has reached the exposure-execution position (x1, y1), the process goes to Step S108, wherein the writing process is performed. Namely, each micro-mirror $X_{ij}$ is turned ON/OFF so as to form a pattern corresponding to the relative position of the exposure area EA.

In Step S109, it is determined whether the relative position of the exposure area EA has reached an end position of the shifted scanned band. When it is determined that the relative position of the exposure area EA has not reached an end position of the shifted scanned band, the process goes to Step S110, wherein the exposure number is incremented by "1". The process returns to Step S104, and Step S104 to S110 are repeatedly performed so that the multiple exposure process is realized. On the other hand, when it is determined that the relative position of the exposure area EA has reached an end position of the shifted scanned band, the process goes to Step S111, wherein it is determined whether the writing process is terminated.

When it is determined that the writing process is not terminated, wherein the process goes to Step S112, a control signal is output from the table controller 38 to the Y-direction driver 48 to shift the exposure area EA along the sub scanning-direction (Y-direction) to a next scanning start position. In Step S113, the number of multiple exposure process "Ne" is initialized, namely, is set to "0". The process returns to Step S103, and Step S103 to S113 are repeatedly performed. On the other hand, when it is determined that the writing process has been terminated, the writing process is terminated.

Figure 7:
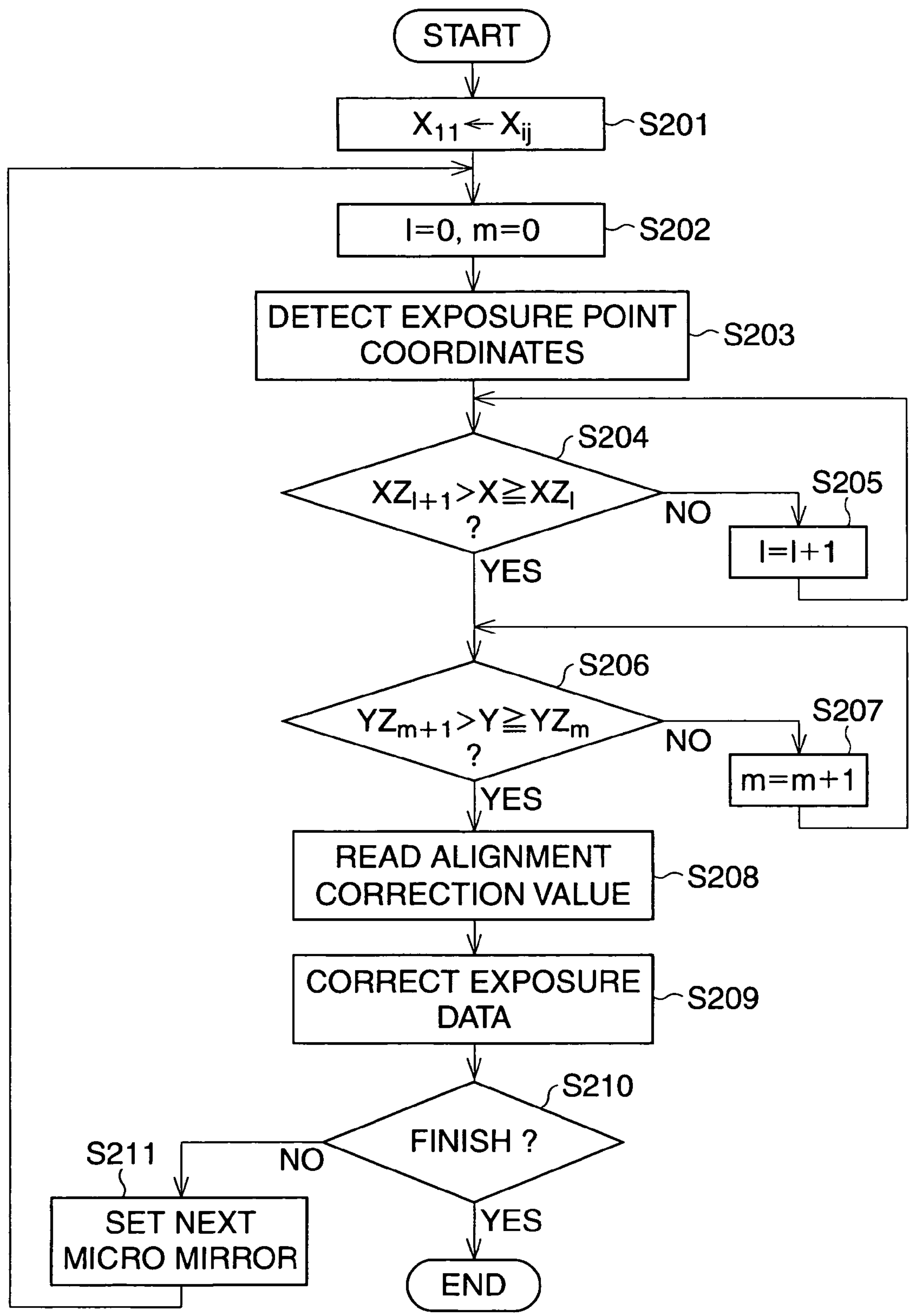
FIG. 7 is a view showing a subroutine of Step S105 in FIG. 6.
Figure 8:
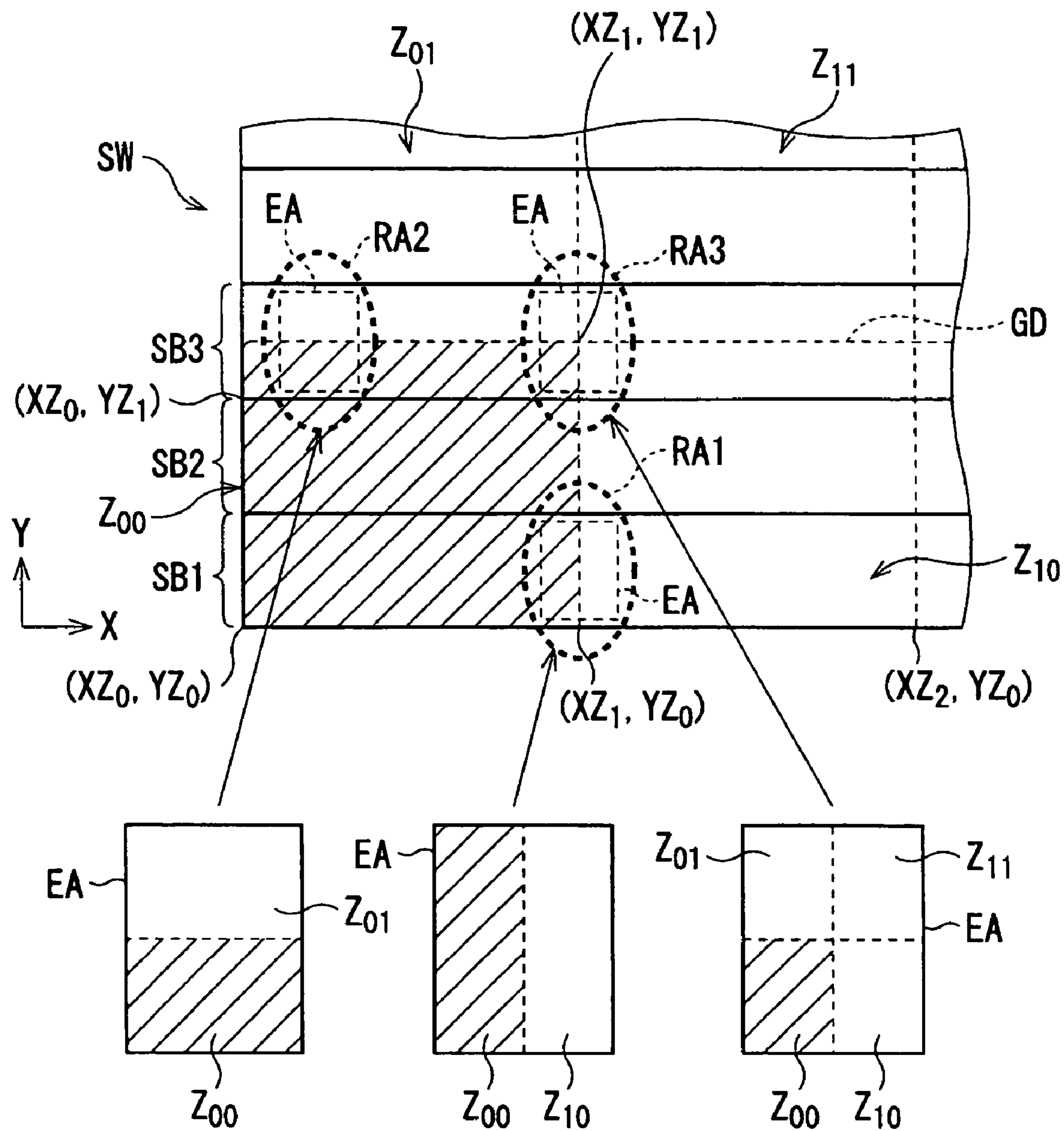
FIG. 8 is a view showing a pattern area and a relative position of an exposure area.
Figure 9:
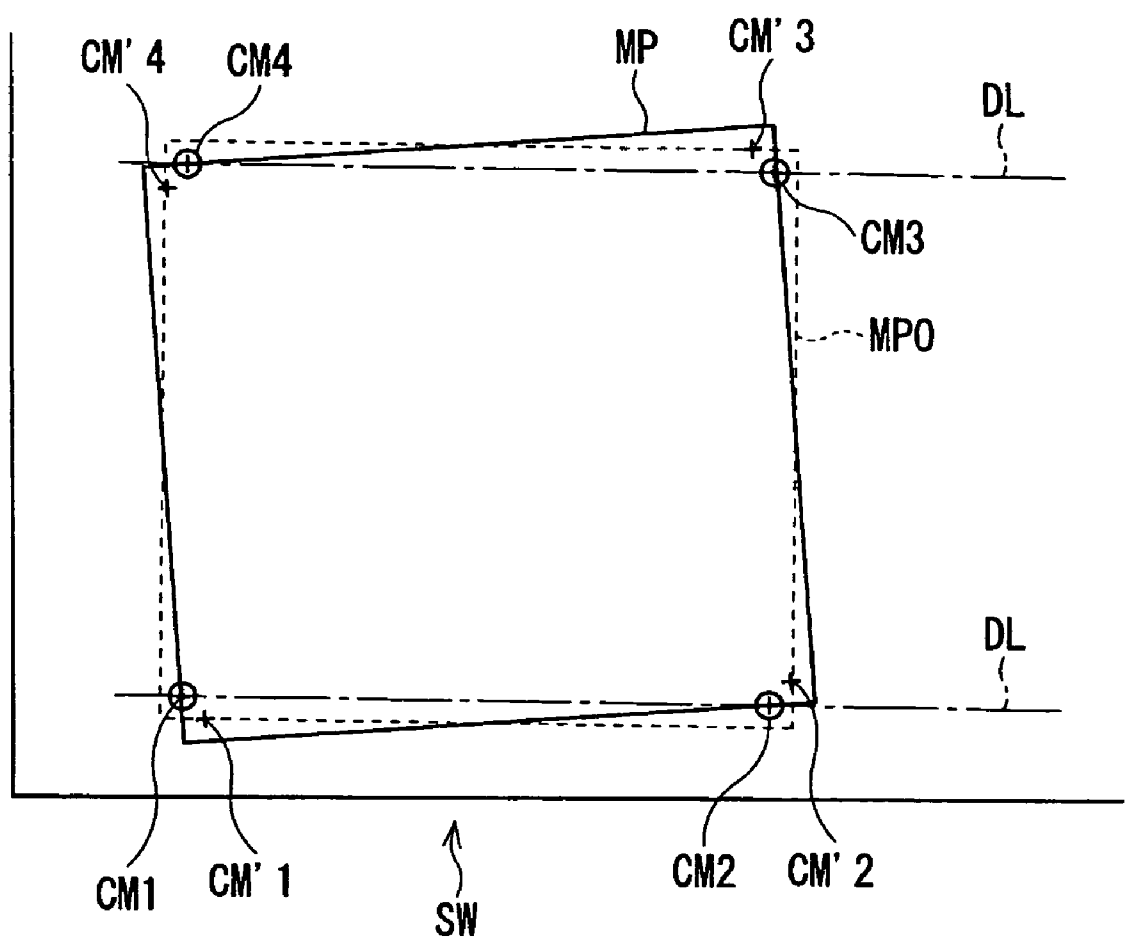
FIG. 9 is a view showing a position-error of a pattern.

FIG. 7 is a view showing a subroutine of Step S105 in FIG. 6. FIG. 8 is a view showing a pattern area and a relative position of an exposure area. FIG. 9 is a view showing a position-error of a pattern.

In Step S201, a micro-mirror $X_{11}$ is set as a first micro-mirror for generating exposure data. In Step S202, a variable (1,m) of the pattern area $Z_{lm}$ is set to an initial value (0, 0). In Step S203, exposure point coordinates (X, Y) are calculated on the basis of the position of the micro-mirror $X_{ij}$ and the relative position of the exposure area EA. Note, the X-Y coordinates are defined as coordinates that represent a position on the total area of the substrate SW, as shown in FIG. 8.

In Step S204, it is determined whether the exposure point coordinate "X" of the micro-mirror $X_{ij}$ satisfies the following formula.

$$XZ_{1+1} > X \geqq XZ_1 \quad (3)$$

"$XZ_1$" and "$XZ_{1+1}$" indicate coordinates of both end points of the pattern area $Z_{lm}$ with respect to the X-direction (See FIG. 8). When it is determined that the exposure point coordinate "X" of the micro-mirror $X_{ij}$ does not satisfy the formula (3), the process goes to Step S205, where in the variable "l" is incremented by 1. Then, Step S204 and S205 are repeatedly performed until the formula (3) is satisfied. On the other hand, when it is determined that the exposure point coordinate "X" of the micro-mirror $X_{ij}$ satisfies the formula (3), the process goes to Step S206.

In Step S206, it is determined whether the exposure-point coordinate (Y) of the micro-mirror $X_{ij}$ satisfies the following formula.

$$YZ_{m+1} > Y \geqq YZ_m \quad (4)$$

Note, "$YZ_m$" and "$YZ_{m+1}$" indicate coordinates of both end points of the pattern area $Z_{lm}$ with respect to the Y-direction. When it is determined that the exposure-point coordinate (Y) of the micro-mirror $X_{ij}$ does not satisfy the formula (4), the process goes to Step S207, wherein the variable "m" is incremented by "1". Then, Step S206 and S207 are repeatedly performed until the formula (4) is satisfied. On the other hand, when it is determined that the exposure-point coordinate (Y) of the micro-mirror $X_{ij}$ satisfies the formula (4), the process goes to Step S208.

In Steps S204 to S207, a pattern area where in the exposure point coordinates (X, Y), which are subjected to correct the exposure data, exist in, is searched. In other words, the exposure data of the exposure point coordinates (X, Y) is classified in a corresponding pattern area. For example, when the relative position of the exposure area EA is an area RA1 shown in FIG. 8, the left side of the exposure area EA exists in the pattern area $Z_{00}$, whereas the right side of the exposure area EA exists in the pattern area $Z_{10}$. When the relative position of the exposure area EA is an area RA2, the lower side of the exposure area EA exists in the pattern area $Z_{00}$, whereas the upper side of the exposure area EA exists in the pattern area $Z_{01}$. Further, when the relative position of the exposure area EA is an area RA3, the left-lower side of the exposure area EA is in the pattern area $Z_{00}$, the right-lower side of the exposure area EA is in the pattern area $Z_{10}$, the left-upper side of the exposure area EA is in the pattern area $Z_{01}$, and the right-upper side of the exposure area EA is in the pattern area $Z_{11}$. After the pattern area that relative position of the micro-mirror $X_{ij}$ exists in, is detected, the process goes to Step S208. In Step S208, alignment correction value of a corresponding pattern area is read from the RAM 32B in the system control circuit 32.

In FIG. 9, the actual position of the pattern MP, which has been formed in the pattern area $Z_{00}$ in advance, is shown. As shown in FIG. 9, the position-error caused in the pattern MP, and the pattern MP is not formed on a right position "MPO", which is shown by a broken line. In the photo-mask, which is used by the exposure unit and which is utilized for forming the pattern MP, four patterns for cross-shaped marks are formed at the corners. Therefore, if the position-error does not exists, four cross-shaped marks CM1 to CM4 are formed in the corner at the correct position "MPO" and formed on a pair of lines "DL". However, as the pattern MP is not formed on the correct position "MPO", the four cross-shaped marks CM' 1 to CM' 4 are formed at positions different from the correct positions.

As described above, the positions of the four marks in each pattern MP are photographed by the cameras 15 while moving the table 18 along the X-direction and the Y-direction, before the writing process is started. Then, the position error of the cross-shaped marks in the image processor 39, namely, the position-error of the pattern is detected on the basis of the position-error from the lines "DL". As for the position-error, a rotation-error, a shift-error in the X-direction or Y-direction, and a scaling error, and so on, are detected. Then, an alignment correction value is calculated in each pattern area on the basis of the detected position-error. The correction values for all of the pattern areas are calculated and stored in the RAM 32B in advance. In Step S208, the corresponding alignment correction value is read from the RAM 32B. After Step S208 is performed, the process goes to Step S209.

In Step S209, a correction process is performed for the exposure data. Namely, the exposure point coordinates of the micro-mirror are corrected on the basis of the alignment correction value. Concretely speaking, the exposure point coordinates are transformed so as to overlay a corresponding pattern on the pattern MP, in other words, match the pattern with the preceding pattern MP.

In Step S210, it is determined whether the correction process has been performed for all of the micro-mirrors. When it is determined that the correction process has not been performed for all of the micro-mirrors, the process goes to Step S211, where in a next micro-mirror is set to a micro-mirror that is subjected to the correction process. Then, the process returns to Step S202, and Steps S202 to S211 are repeatedly performed. On the other hand, when it is determined that the correction process has been performed for all of the micro-mirrors, the process is terminated.

Other light-modulating units, such as an LCD, may be applied instead of the DMD. The position-error may be detected by another method without the camera. The size of the pattern area is not restricted to a constant square size. The pattern area may be a rectangular, formed by a regular grid. The alignment correction value may be calculated on the basis of other position-errors instead of the rotation-error or the shift-error. The data correction process may be performed for the vector data instead of the raster data. Further, the correction process may be performed for the total area of the substrate before the writing process.

Since the substrate occasionally deforms due to the heat process, the data correction process may be performed for a substrate wherein no preceding pattern is formed in advance. In this case, four holes are formed in the corners of the pattern area in advance, and position-error is detected on the basis of the positions of the holes and marks formed at the corners of the pattern area.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No. 2004-233146 (filed on Aug. 10, 2004), which is expressly incorporated herein, by reference, in its entirety.

The invention claimed is:

1. An apparatus for forming a pattern comprising:

a light-modulating unit, including a plurality of regularly arrayed light modulators, configured to expose an area of a photo-sensitive material by selectively directing light emitted from a light source to the area of the photo-sensitive material;

a scanner configured to scan the exposure area, exposed by said light modulating unit, along a direction defined by a series of scanning bands;

a pattern data processor configured to generate band-pattern data corresponding to each scanning band on the basis of pattern data matching a preceding pattern that is repeatedly and regularly formed on the photo-sensitive material;

a light-modulating controller configured to control said light modulators in accordance with the band-pattern data to form a pattern on the photo-sensitive material;

a position-error detector configured to detect a position-error of the preceding pattern relative to a pattern area surrounded by a grid defined on the photo-sensitive material so as to encompass the preceding pattern; and a correction value calculator configured to calculate an alignment correction value in each pattern area on the basis of the position-error, to overlay the pattern on the preceding pattern, wherein said pattern data processor is further configured to correct the band-pattern data in accordance with the alignment correction value while classifying each exposure data of the band-pattern data into a corresponding pattern area.

2. The apparatus of claim 1, wherein said pattern data is processor is further configured to correct the band-pattern data in accordance with a relative-position of the exposure area.

3. The apparatus of claim 1, wherein the pattern data is vector data, and said pattern data processor is further configured to generate exposure data corresponding to an array of said light modulators as raster data.

4. The apparatus of claim 1, wherein said position-error detector is further configured to detect at least one of a rotation-error relative to the pattern area and a shift-error relative to the pattern area.

5. An apparatus for correcting pattern data comprising:

a pattern data processor configured to generate band-pattern data corresponding to each scanning band on the basis of pattern data matching a preceding pattern that is repeatedly and regularly formed on a photo-sensitive material;

a position-error detector configured to detect a position-error of the preceding pattern relative to a pattern area surrounded by a grid defined on the photo-sensitive material so as to encompass the preceding pattern; and a correction value calculator configured to calculate an alignment correction value in each pattern area on the basis of the position-error, to overlay the pattern on the preceding pattern, wherein said pattern data processor is further configured to correct the band-pattern data in accordance with the alignment correction value while classifying each exposure data of the band-pattern data into a corresponding pattern area.

6. An apparatus of claim 5, wherein said pattern data processor is further configured to correct the band-pattern data in accordance with a relative-position of an exposure area.

7. The apparatus of claim 5, further comprising:

an array of light modulators configured to selectively direct light emitted from a light source to the photo-sensitive material, the pattern data processor being further configured to generate exposure data corresponding to the array of light modulators as raster data.

8. The apparatus of claim 7, wherein said position-error detector is further configured to detect at least one of a rotation-error relative to the pattern area and a shift-error relative to the pattern area.

9. The apparatus of claim 7, wherein the pattern data is vector data, and said pattern data processor is further configured to generate exposure data corresponding to an array of said light modulators as raster data.

10. The apparatus of claim 9, wherein the pattern data is vector data, and said pattern data processor is further configured to generate exposure data corresponding to an array of said light modulators as raster data.

11. The apparatus of claim 5, wherein said position-error detector is further configured to detect at least one of a rotation-error relative to the pattern area and a shift-error relative to the pattern area.

12. An apparatus for forming a pattern comprising:

a light-modulating unit, including a plurality of regularly arrayed light modulators, configured to expose an area of a photo-sensitive material by selectively directing light emitted from a light source to the photo-sensitive material;

a scanner configured to scan the exposure area, exposed by said light modulating unit, along a direction defined by a series of scanning bands;

a pattern data processor configured to generate band-pattern data corresponding to each scanning band on the basis of pattern data for forming a pattern repeatedly and regularly on the photo-sensitive material;

a light-modulating controller configured to control said light modulators respectively in accordance with the band-pattern data to form a pattern on the photo-sensitive material;

a position-error detector configured to detect a position-error of the preceding pattern relative to a pattern area surrounded by a grid defined on the photo-sensitive material so as to encompass the preceding pattern; and a correction value calculator configured to calculate an alignment correction value in each pattern area on the basis of the position-error, to overlay the pattern on the preceding pattern, wherein said pattern data processor is further configured to correct the band-pattern data in accordance with the alignment correction value while classifying each exposure data of the band-pattern data into a corresponding pattern area.

13. An apparatus of claim 12, wherein said pattern data processor is further configured to correct the band-pattern data in accordance with a relative-position of an exposure area.

14. The apparatus of claim 12, wherein the pattern data is vector data, and said pattern data processor is further configured to generate exposure data corresponding to an array of said light modulators as raster data.

15. The apparatus of claim 12, wherein said position-error detector is further configured to detect at least one of a rotation-error relative to the pattern area and a shift-error relative to the pattern area.

16. An apparatus for correcting pattern data, comprising:

a pattern data processor configured to generate band-pattern data corresponding to each scanning band on the basis of pattern data for forming a pattern repeatedly and regularly on a photo-sensitive material;

a position-error detector configured to detect a position-error of a preceding pattern relative to a pattern area surrounded by a grid defined on the photo-sensitive material so as to encompass the preceding pattern; and a correction value calculator configured to calculate an alignment correction value in each pattern area on the basis of the position-error, to overlay the pattern on the preceding pattern, wherein said pattern data processor is further configured to correct the band-pattern data in accordance with the alignment correction value while classifying each exposure data of the band-pattern data into a corresponding pattern area.

17. An apparatus of claim 16, wherein said pattern data processor is further configured to correct the band-pattern data in accordance with a relative-position of an exposure area.

18. The apparatus of claim 16, wherein said position-error detector is further configured to detect at least one of a rotation-error relative to the pattern area and a shift-error relative to the pattern area.

19. The apparatus of claim 16, further comprising:

an array of light modulators configured to selectively direct light emitted from a light source to the photosensitive material, the pattern data processor being further configured to generate exposure data corresponding to the array of light modulators as raster data.

* * * * *